Aug. 8, 1939.　　　　M. CARVER　　　　2,168,973
AUTOMOBILE-HOOD LOCK
Filed Oct. 4, 1937　　　2 Sheets-Sheet 1
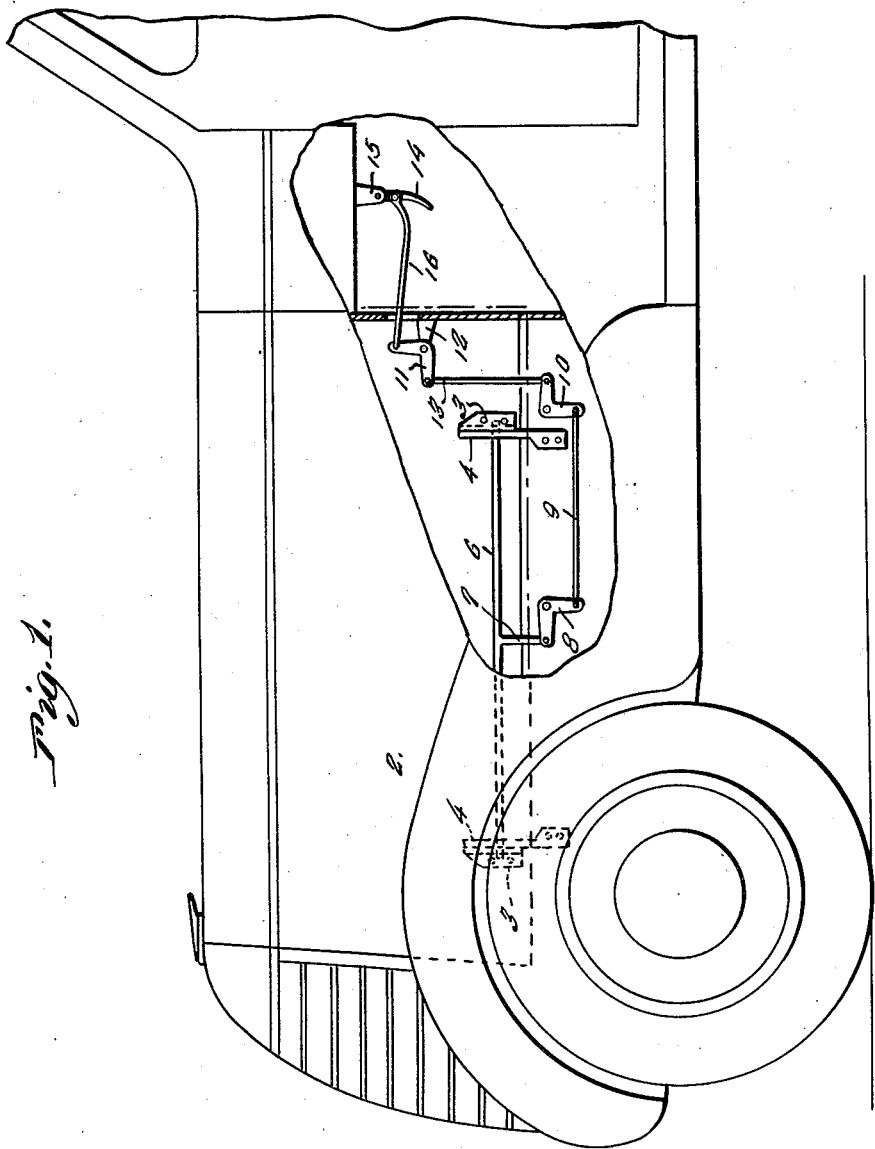
Inventor
Melvin Carver
By L. B. James
Attorney Aug. 8, 1939.                M. CARVER                 2,168,973
                        AUTOMOBILE-HOOD LOCK
             Filed Oct. 4, 1937            2 Sheets-Sheet 2
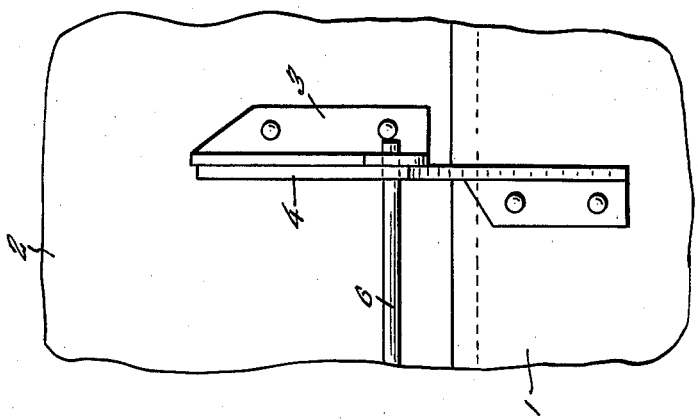
Fig. 4.
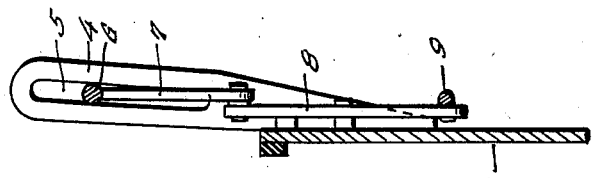
Fig. 5.
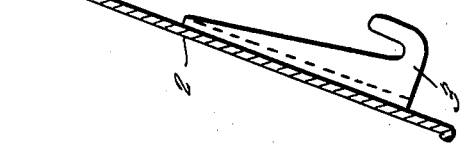
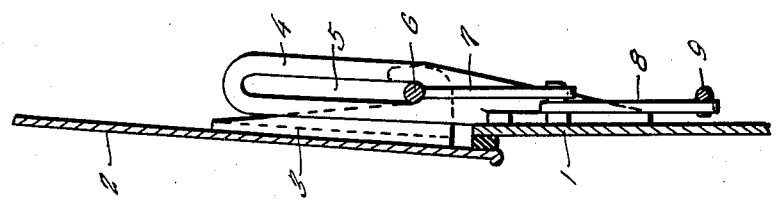
Fig. 6.
Inventor
Melvin Carver
By L. B. James
Attorney Patented Aug. 8, 1939

2,168,973

UNITED STATES PATENT OFFICE 2,168,973

AUTOMOBILE-HOOD LOCK

Melvin Carver, Carlsbad, N. Mex.

Application October 4, 1937, Serial No. 167,289

2 Claims. (Cl. 292—158)

This invention relates to a hood lock, the general object of the invention being to provide means for preventing the panels of the hood of a motor vehicle from being raised until the locking means are moved to released position from the interior of the body of the vehicle.

The invention also consists in certain other features of construction, combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Fig. 1 is an elevation of the front part of a vehicle equipped with the invention, with parts broken away.

Fig. 2 is a vertical sectional view through part of the hood and a panel, with the door in locked position.

Fig. 3 is a similar view but with the panel in partly raised position.

Fig. 4 is a fragmentary interior view showing the panel in locked position.

Fig. 5 is a view of one of the keeper members.

In these drawings, the numeral 1 indicates the lower part of a side of the hood and the numeral 2 indicates the panel at said side of the hood.

In carrying out the invention, a pair of hook shaped keeper members 3 is attached to the lower edge of the panel, in spaced relation and a pair of brackets 4 is fastened to the inside of the part 1, each bracket having a part projecting above said part 1, with the upper part having an elongated slot 5 therein. A rod 6 has its ends slidably supported in the slots and an arm 7 depends from the central part of the rod. A bell-crank 8 is pivoted to the part 1 and has one end pivoted to the arm. A link 9 is pivoted to the other end of the bell crank and the other end of the link is pivoted to one end of a second bell-crank 10, pivoted to the part 1, in rear of the first bell-crank. A third bell-crank 11 is pivoted to a bracket 12, fastened to the front face of the dash and a link 13 connects this bell-crank to the bell-crank 10. A handle member 14 is pivoted to a depending bracket 15 in the interior of the vehicle and a link 16 connects the handle member with the bell-crank 11, the link 16 passing through a hole in the dash, as shown.

Thus it will be seen, that when the panel is closed the rod 6 will engage in the hook shaped keeper members 3, on the inner face of the panel, and as the rod is held in the slots of the brackets 4, the rod will hold the panel in closed position and the door cannot be opened or raised. When it is desired to open the panel it is necessary to swing the handle member 14 forwardly, which will cause the linkage, including the links and bell-cranks, to raise the rod 6 in the slots of the brackets 4, so that the rod will pass out of the keeper members, and then the panel can be raised to open position, as shown in Fig. 3. Of course, there is a similar arrangement of parts for the panel on the other side of the hood. This enables one panel to be unlatched without unlatching the other panel.

It is thought from the foregoing description that the advantages and novel features of the invention will be readily apparent.

It is to be understood that changes may be made in the construction, combination and arrangement of the several parts, provided such changes fall within the scope of the appended claims.

What I claim and desire to protect by Letters Patent is:

1. A latch device for the panel of a motor vehicle hood comprising brackets adapted to be secured to the inner face of a hood in spaced relation to each other longitudinally thereof with portions projecting therefrom for overlapping the inner face of a hood panel, the projecting portions of said brackets being each formed with a slot, a rod extending between said brackets with its end portions loosely engaged through the slots thereof and projecting laterally from sides of the brackets in position to engage spaced keepers carried by the hood panel, an arm rigid with and extending from said rod substantially midway the length thereof, a bell crank having one arm pivoted to the end of the arm on said rod, and means connected with the other arm of the bell crank for turning the bell crank about its pivot and exerting pull upon the arm on the rod to draw the rod into latching engagement with the spaced keepers.

2. In a latching device for the panel of a motor vehicle hood wherein the panel carries hooked keepers spaced from each other longitudinally on the inner face of the panel, guide brackets carried by the hood and disposed adjacent the keepers when the panel is closed and formed with vertical guide slots, a rod extending between the brackets with its ends loosely engaged through the slots and projecting from the brackets for engagement with the hooked keepers, a rigid arm depending from said rod intermediate the brackets, and actuating means pivoted to the lower end of the arm for drawing the arm and rod downwardly to lowered position with the ends of the rod in locking engagement with the hooked keepers.

MELVIN CARVER.